Patented May 27, 1930

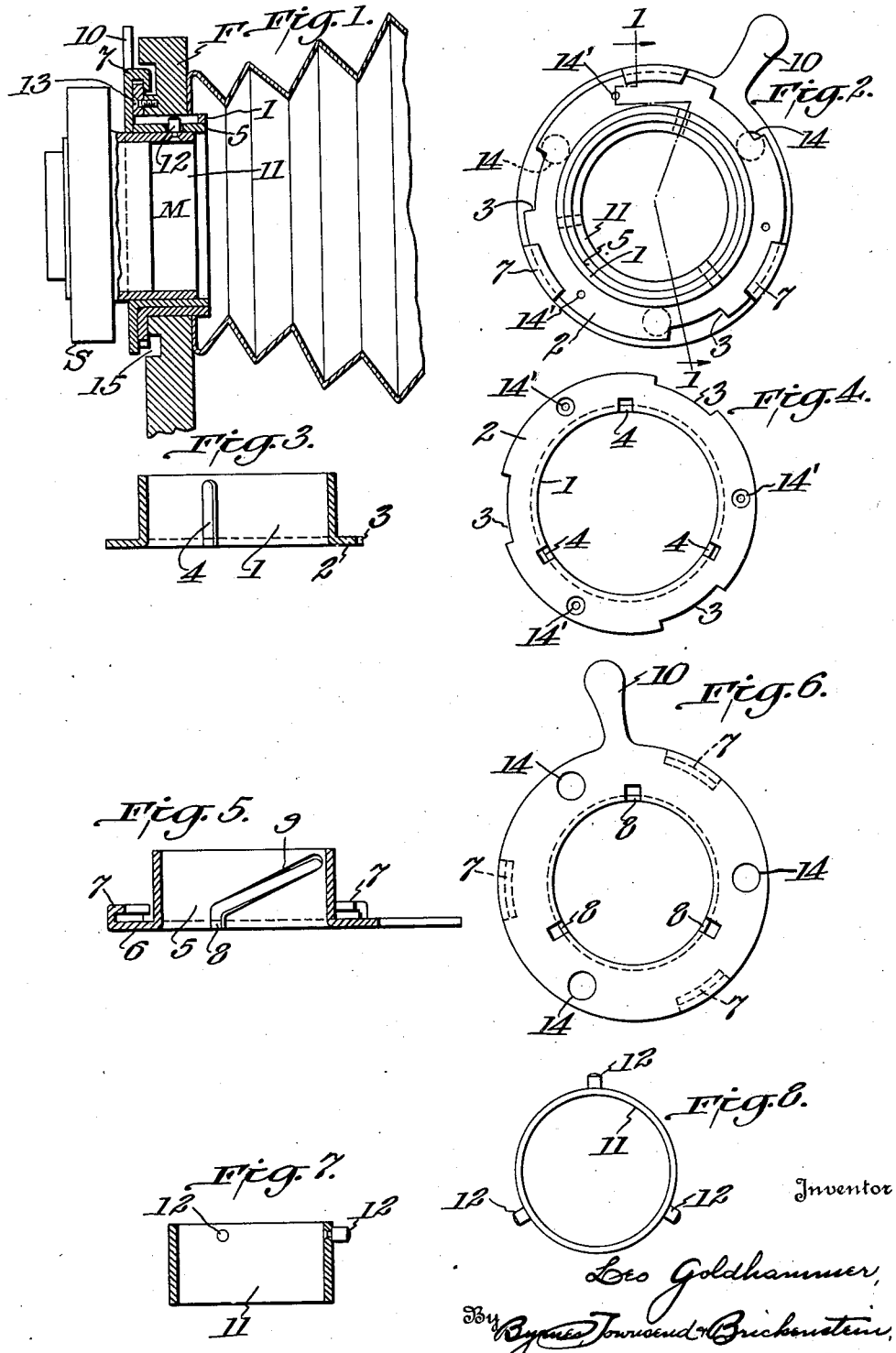

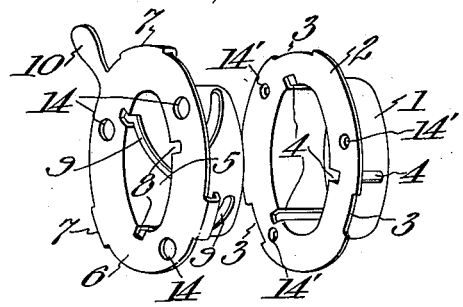
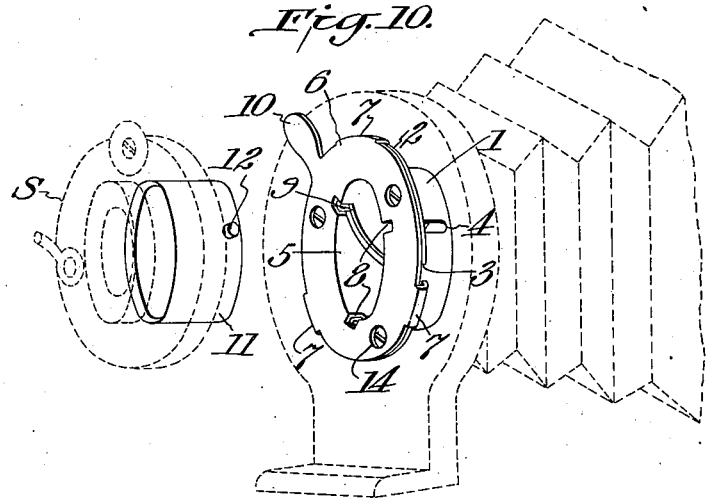

1,760,827

UNITED STATES PATENT OFFICE

LEO GOLDHAMMER, OF MUNICH, GERMANY, ASSIGNOR, BY MESNE ASSIGNMENTS, TO AGFA ANSCO CORPORATION, OF BINGHAMTON, NEW YORK, A CORPORATION OF NEW YORK

LENS MOUNTING

Application filed June 18, 1926, Serial No. 116,966, and in Germany November 16, 1925.

This invention relates to a lens mounting and particularly to a mounting of the type in which the rotary movement of one part of the mounting effects the axial adjustment of the lens.

Previous mountings of this general type have employed an inner or lens-carrying sleeve which was connected to the outer sleeve by a fine helical thread or a counter ring. The sleeves must fit exactly into each other to prevent the penetration of light and to permit of easy relative rotation. Accurate fitting of such lens mountings has been extremely difficult and tedious, and the relative rapid wear on the sleeves permits penetration of light and interferes with the accurate adjustment of the lens. In assembling such devices, it has been necessary to repeatedly disassemble the sleeves to obtain an accurate fitting and frequently the strain placed on the guide pins has been sufficient to tear them out of their sockets. Moreover, to disassemble the mounting, the guide pins can be screwed into the inner sleeve only from the outside and then only when the three sleeves are accurately positioned to align the slots in the central and outer sleeve with the threaded sockets of the inner sleeve.

An object of the invention is to provide a mounting of the type stated which will be free from the objections noted above. An object is to provide a mounting in which the central or rotating sleeve and the outer or fixed sleeve are held against relative axial movement by a plurality of U-shaped flanges on one member which fit over projecting flanges on the other member. Further objects are to provide lens mountings in which the inner sleeve with the guide pins assembled thereon, may be inserted in the assembled central and outer sleeves, and in which the construction is such that the inner sleeve cannot be inadvertently separated from the mounting by the rotation of the central sleeve.

In the accompanying drawings, which illustrate the embodiment of the invention,

Fig. 1 is a fragment sectional view of the mounting in place on a camera, the section through the mounting being taken on line 1—1 of Fig. 2;

Fig. 2 is a rear elevation of the assembled mounting;

Figs. 3 and 4 are a central section and front elevation, respectively, of the outer sleeve;

Figs. 5 and 6 are a central section and front elevation, respectively, of the central sleeve;

Figs. 7 and 8 are a central section and an elevation, respectively, of the inner sleeve;

Fig. 9 is a perspective view showing the outer and central sleeves in longitudinal alignment for assembly, and Fig. 10 is a perspective view of the assembled outer and central sleeves in longitudinal alignment with and positioned to receive the inner sleeve, certain of the camera elements being also shown but in dotted line.

As shown in Fig. 1, the lens mounting M carries the usual shutter S and is fixed to the front F of the camera by screws which pass through openings in the outer sleeve member.

In the drawings, the numeral 1 indicates the outer or stationary sleeve which is provided at its outer end with a radial flange 2 the edge of the flange being circumferentially notched to provide a plurality of recesses 3. A plurality of axial slots 4 extend through the wall of the sleeve 1 and are open through the radial flange 2. The recesses 3 and slots 4 are arranged out of radial alignment with each other, and while the drawing illustrates the preferred construction on which groups of three are employed. the invention is not limited to any particular number of these elements.

The central sleeve 5 is of such external diameter as to fit snugly within the outer sleeve 1, and the central sleeve has a radial flange 6 which has a plurality of inturned extensions or U-shaped flanges 7 for engagement over the radial flange 2 of the sleeve 1. The flanges 7 are so spaced and their inner legs are of such length that the sleeves 1 and 2 may be assembled by bringing the flanges 7 in axial alignment with the recesses 3, Fig. 9 and then turning the sleeves after their radial flanges are brought into engagement. The central sleeve 5 is provided with slots which are of the same number and circumferential arrangement as the slots 4 of sleeve 1. The outer portions 8 of these slots extend through the flange 6 and axially of the sleeve, but the inner portions 9 of the slots are arranged helically of the sleeve. The flange 6 is provided with a radial extension or handle 10 for convenience in adjusting the same.

The inner sleeve 11, or lens carrier, fits snugly within the inner wall of the central sleeve and is provided with guide pins 12 which may be riveted or otherwise permanently secured to the sleeve.

To assemble the mounting, the outer and inner sleeves are assembled as described above and the outer portions 8 of the slots of the central sleeve are brought into coincidence with the outer portions of slots 4 of the outer sleeve, Fig. 10. The inner sleeve is slid into the assembly with guide pins 12 entering the slots of the outer and central sleeves. The inner sleeve is pushed inwardly until the pins reach the helical slots 9 and further axial adjustment of the sleeve may then be made by turning the central sleeve. Due to the provision of the axial portion 8 of the slots of the central sleeve, the rotation of that sleeve cannot force the inner sleeve out of the assembly. The portions 8 thus act as stops preventing the rotation of sleeve 5 into such position that flanges 7 align with recesses 4.

As shown in Fig. 1, the lens mounting is fixed to the front board F of a camera by means of screws 13 which pass through suitable openings 14 in the central sleeve and through openings 14' in the outer sleeve member. The front board is provided with a suitable annular recess 15 within which the U-shaped flanges 7 are disposed. The device may be assembled separately by itself and then attached to the front-board by means of the screws 13.

The inner sleeve is of course provided with means, not shown, for carrying the shutter S and the inner member of the lens system.

While the embodiment herein shown and described is the preferred construction, it will be understood that there is a considerable latitude in the design and arrangement of the several parts and that various changes in the elements may be made without departing from the spirit of the invention as set forth in the following claims.

I claim:

1. A lens mounting of the type comprising an outer fixed sleeve, a central rotatable sleeve and an inner axially-movable sleeve, characterized by the fact that the outer and central sleeves have radial flanges in contact with each other, and a plurality of circumferentially spaced U-shaped flanges on one sleeve engage the peripheral edge of the flange of the other sleeve to prevent relative axial movement of the said outer and central sleeves.

2. The invention as set forth in claim 1, wherein the U-shaped flanges are carried by the central sleeve.

3. A lens mounting comprising an outer fixed sleeve, a central sleeve rotatable therein, an inner sleeve having guide pins, said outer and central sleeves having cooperating slots for the reception of said guide pins, said slots being open at the front end of the respective sleeves.

4. A lens mounting comprising an outer fixed sleeve, a central sleeve rotatable therein, an inner sleeve having guide pins, and cooperating slots in said outer and central sleeves, said slots being open at the front end of the respective sleeves, the chief parts of the slots in the central sleeve being helical, and their short open ends having another direction than the chief parts of the slots.

5. A lens mounting comprising an outer fixed sleeve, a central sleeve rotatable therein, an inner sleeve having guide pins, the wall of said outer sleeve being provided with axial slots which open through the front edge thereof, said central sleeve being provided with short helical axial slots opening at the front edge of said central sleeve and merging into the respective helical slots, these short axial slots preventing the inner sleeve to be pressed out by the rotation of the central sleeve.

6. A focusing mechanism for cameras comprising a support, a fixed barrel thereon having straight axial guide slots cut in from its free edge, a member slidable in said barrel and having pins engaging said axial guide slots, and a barrel rotatably mounted with respect to said first mentioned barrel and having cam slots in which the pins of said sliding member also engage, and means for rotating said rotatably mounted barrel.

In testimony whereof, I affix my signature.

LEO GOLDHAMMER.